(12) United States Patent
Chiang (10) Patent No.: US 11,467,431 B2
(45) Date of Patent: Oct. 11, 2022

(54) SWIMMING GOGGLES

(71) Applicant: Global Esprit Inc., New Taipei (TW)

(72) Inventor: Herman Chiang, New Taipei (TW)

( * ) Notice: Subject to any disclaimer, the term of this patent is extended or adjusted under 35 U.S.C. 154(b) by 288 days.

(21) Appl. No.: 16/683,190

(22) Filed: Nov. 13, 2019

(65) Prior Publication Data

US 2021/0106876 A1 Apr. 15, 2021

(30) Foreign Application Priority Data

Oct. 9, 2019 (TW) .................................. 108213403

(51) Int. Cl.
*G02C 11/08* (2006.01)
*A63B 33/00* (2006.01)

(52) U.S. Cl.
CPC ............ *G02C 11/08* (2013.01); *A63B 33/004* (2020.08)

(58) Field of Classification Search
CPC ...... A63B 33/002; A63B 33/004; G02C 11/08
See application file for complete search history.

(56) References Cited

U.S. PATENT DOCUMENTS

| 2006/0119948 A1* | 6/2006 | Matsumoto | A61F 9/02 359/624 |
| 2019/0381361 A1* | 12/2019 | Yeomans | G06T 17/00 |
| 2021/0362007 A1* | 11/2021 | Stephens | B63C 11/12 |

* cited by examiner

*Primary Examiner* — F Griffin Hall (57) ABSTRACT

Swimming goggles of the present invention include a pair of lenses. Each lens has a window. The window is connected with a ventilated waterproof device that is watertight but not airtight, through which a heat on an inner side of the lens produced by human body in form of fog and water particles permeates toward an outer side of the lens; relatively, fog on the outer side of the lens is soon turned into water drops through condensation, the water drops are too large to undergo reverse permeation into the inner side of the lens; because of the effect of surface tension within the condensed water drops, water molecules pull each other as a stable state and are unable to be separated from the water drops toward the inner side of the lens so that the water leakage of the swimming goggles is eliminated and waterproof function is achieved.

18 Claims, 10 Drawing Sheets

SWIMMING GOGGLES

BACKGROUND OF THE INVENTION

1. Field of the Invention

The present invention relates generally to swimming goggles and in particular to swimming goggles which provide a ventilated waterproof effect.

2. Related Art

The most annoying thing during swimming is water leakage and fog on swimming goggles. Generally, the fog on swimming goggles is caused by the difference in temperature between an outside of a lens in touch with water and an inside of the lens with respect to a wearer's eye. In details, once heat produced by human body is in contact with lower temperature water through the lens, heat is subject to the difference in temperature and is unable to diffuse rapidly so as to form the fog on the inside of the lens. A conventional way to resist the fog on swimming goggles is pasting an antifog film or proceeding with an anti-fog treatment, or directly using an antifog plate as a material of the lens. However, no matter what kind of the conventional ways are used, they only focus on the antifog function, rather than ventilation function. Consequently, the antifog effect of conventional swimming goggles is not as expected. It is needed to be improved.

SUMMARY OF THE INVENTION

An object of the present invention is to provide swimming goggles, capable of outwardly dissipating heat produced by human body on an inner side of the lens to avoid fog on the lens, so as to achieve a ventilated waterproof effect.

To attain this, swimming goggles of the present invention are characterized in that: each lens has a window, the window is connected with a ventilated waterproof device that is watertight but not airtight, through which a heat on an inner side of the lens produced by human body in form of fog and water particles permeates toward an outer side of the lens as a way of fog dispersion; relatively, fog on the outer side of the lens is soon turned into water drops through condensation, the water drops are too large to undergo reverse permeation into the inner side of the lens; because of the effect of surface tension within the condensed water drops, water molecules pull each other as a stable state and are unable to be separated from the water drops toward the inner side of the lens so that the water leakage of the swimming goggles is eliminated and waterproof function thereof is thus achieved.

Accordingly, the ventilated waterproof device includes a ventilated waterproof film having a plurality of micropores. The ventilated waterproof film is fixed on the window.

Accordingly, the window is disposed at a lower edge, an upper edge, a lower corner of a side edge, or an upper corner of the side edge of the lens in order to not obstruct a view of a wearer's eyes.

Accordingly, the ventilated waterproof device further includes a protection sheet having a plurality of pinholes. Each of the plurality of the pinholes has a hole diameter which is greater than or equal to a pore diameter of each of the plurality of the micropores of the ventilated waterproof film.

Accordingly, the ventilated waterproof device further has an arc shield having a plurality of through holes. Each of the plurality of the through holes is larger than each of the plurality of the micropores of the ventilated waterproof film. The arc shield is fixed on the outer side of the lens corresponding the window.

Accordingly, the ventilated waterproof device includes a frame and a ventilated waterproof film. The frame is with a tight fit to the window. The frame has mounting holes, while the ventilated waterproof film has a plurality of the micropores. The plurality of the micropores are arranged on the mounting holes.

Accordingly, the frame is a rubber sleeve including mounting holes and a neck. An external diameter of the neck is slightly greater than a diameter of the window for the tight fit to the window. A joint between the neck of the frame and the window is further applied with a glue.

Accordingly, the frame includes a base and a wearing ring. The wearing ring is defined with a channel to fit to a periphery of the window. The base is arranged with a clamping slot which clamps the wearing ring from the outer side of the lens to fix the wearing ring onto the window. The base is disposed with mounting holes corresponding to the window of the lens. The ventilated waterproof film has a plurality of micropores and is fixed on the mounting holes from the inner side of the lens.

DESCRIPTION OF THE INVENTION

Figures 1A, 1B:
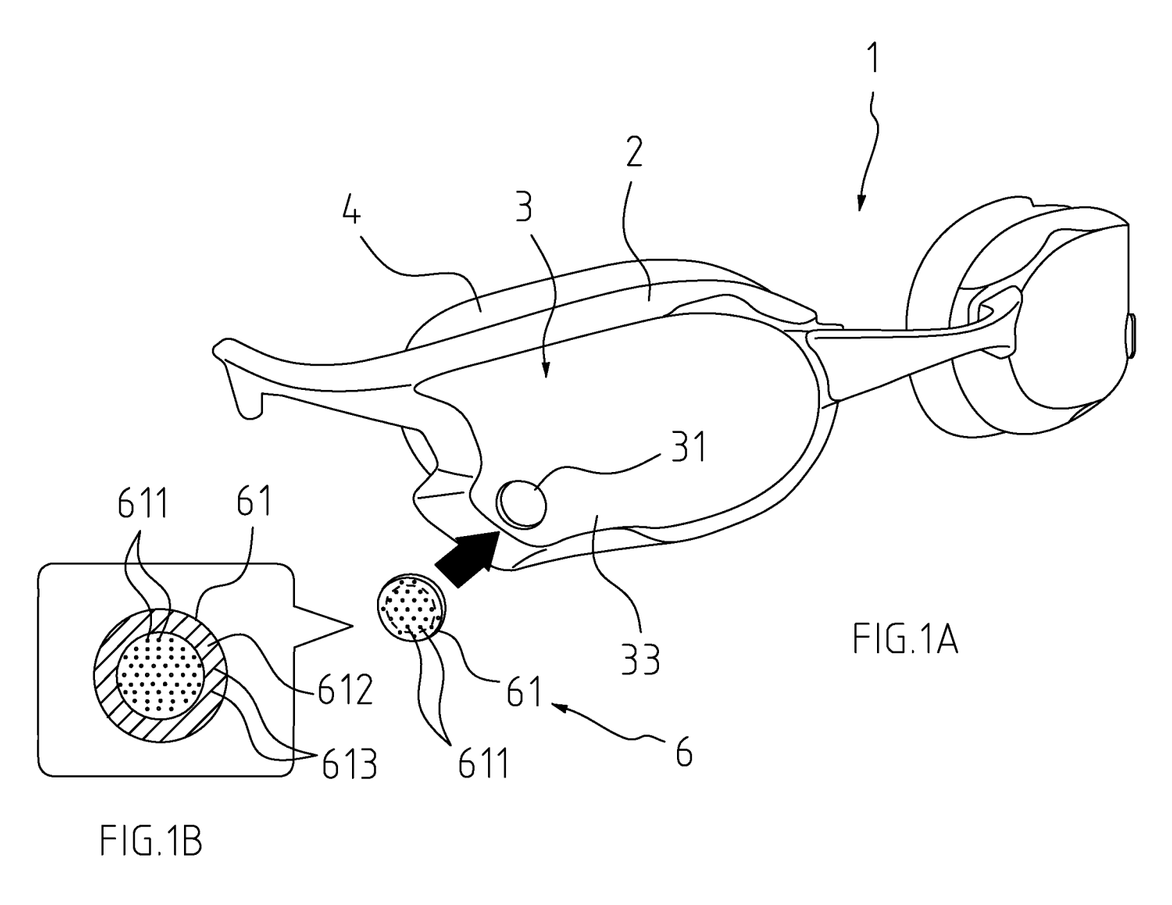
FIG. 1A is an exploded perspective view of swimming goggles of the present invention.
FIG. 1B is an enlarged view of swimming goggles of the present invention.

Referring to FIG. 1A and FIG. 1B, an exploded perspective view and an enlarged view of swimming goggles of the present invention are respectively shown. The swimming goggles 1 of the present invention have a symmetrical structure including a pair of bodies 2, lenses 3 and protection pads 4, and a head strap (not shown). Each lens 3 has a window 31. The window 31 penetrates throughout the lens 3 and is located at a lower corner of a side edge of the lens 3. The window 31 is connected with a ventilated waterproof device 6. The ventilated waterproof device 6 includes a ventilated waterproof film 61. The ventilated waterproof film 61 is made of polytetrafluoroethylene and forms a plurality of micropores 611 by means of extrusion and stretch. Preferably, each of the plurality of the micropores 611 has a pore diameter of 0.1~0.5 μm. An edge of a side of the ventilated waterproof film 61 has an adhesive area 612. The adhesive area 612 is applied with a glue 613 by which the ventilated waterproof film 61 is fixed on the window 31 from an outer side 33 of the lens 3.

Figure 1C:
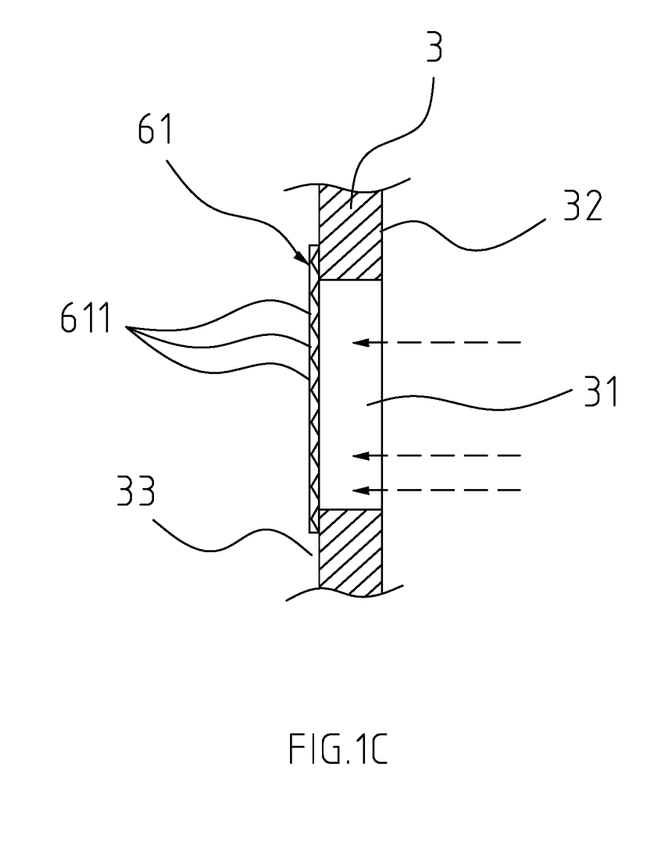
FIG. 1C is a partial cross-sectional view of swimming goggles including an assembly of a ventilated waterproof film and a lens.

Therefore, with reference to FIG. 1C, the plurality of the micropores 611 of the ventilated waterproof film 61 allow a heat on an inner side 32 of the lens 3 produced by human body in form of fog and water particles to permeate therethrough toward the outer side 33 of the lens 3 as a way of fog dispersion.

Relatively, fog on the outer side 33 of the lens 3 is soon turned into water drops through condensation. The water drops are too large to undergo reverse permeation into the inner side 32 of the lens 3 through the plurality of the micropores 611. Because of the effect of surface tension within the condensed water drops, water molecules pull each other as a stable state and are unable to be separated from the water drops toward the inner side 32 of the lens 3 so that the water leakage of the swimming goggles is eliminated and waterproof function thereof is thus achieved.

Figure 2:
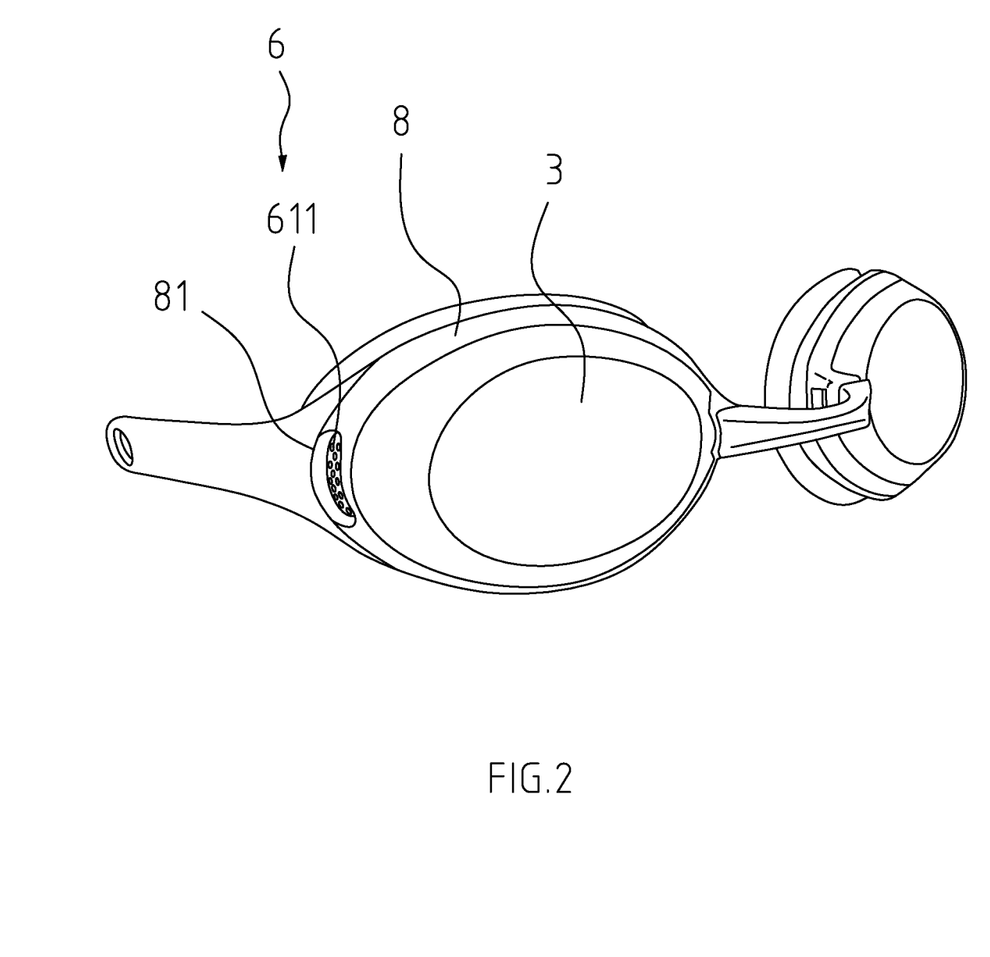
FIG. 2 is a perspective view illustrating the ventilated waterproof film disposed on a different kind of swimming goggles.
Figure 3A:
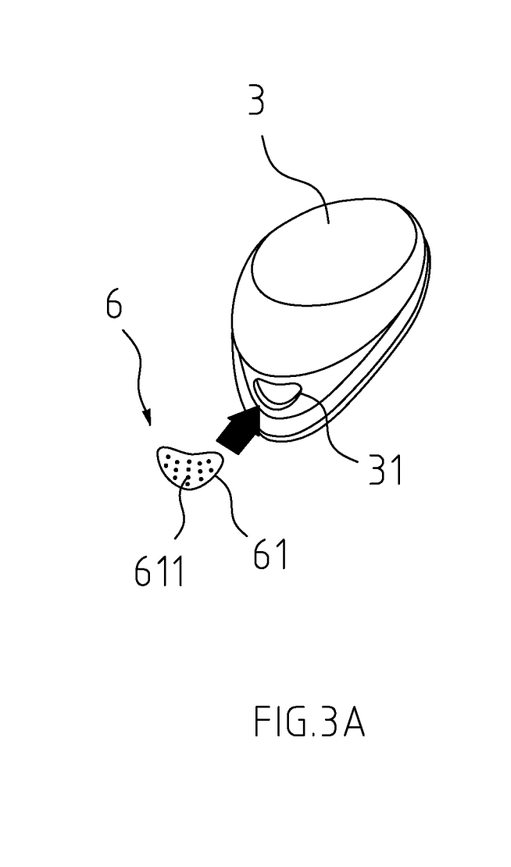
FIG. 3A and FIG. 3B are assembly perspective views of swimming goggles of FIG. 2.
Figure 3B:
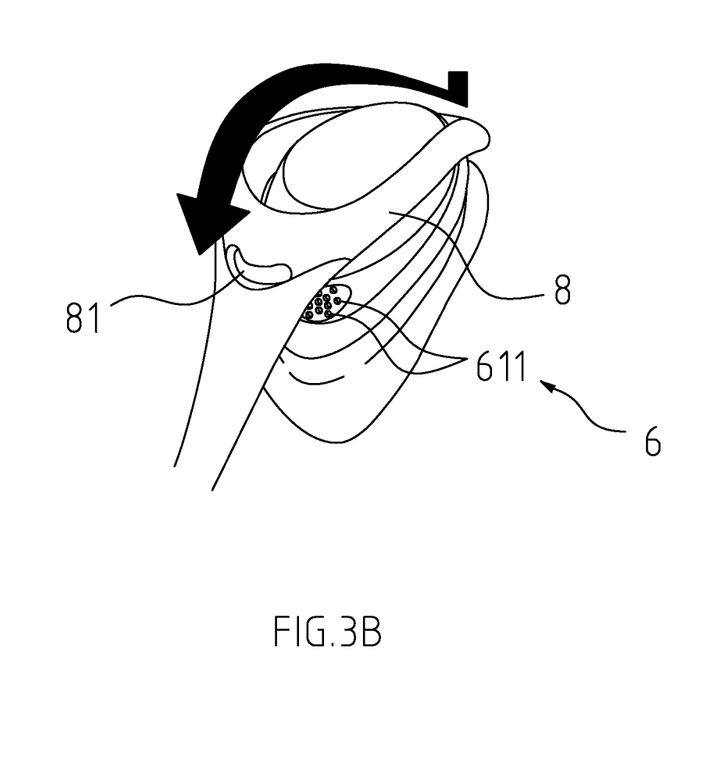

With reference to FIG. 2 and FIGS. 3A and 3B, a perspective view and perspective assembly views are respectively shown, which illustrate that the ventilated waterproof film 61 of the ventilated waterproof device 6 is disposed on a different kind of swimming goggles. The window 31 is arranged on a side edge of the lens 3 and is sheltered by a body 8. The body 8 is mounted with a breaking hole 81 corresponding to the window 31. (FIG. 3B). The ventilated waterproof film 61 of the ventilated waterproof device 6 of the present invention is fixed on the window 31 by means of adhesive (FIG. 3A), so that the micropores 611 of the ventilated waterproof film 61 also achieves the waterproof and ventilation function.

Figures 4A, 4B:
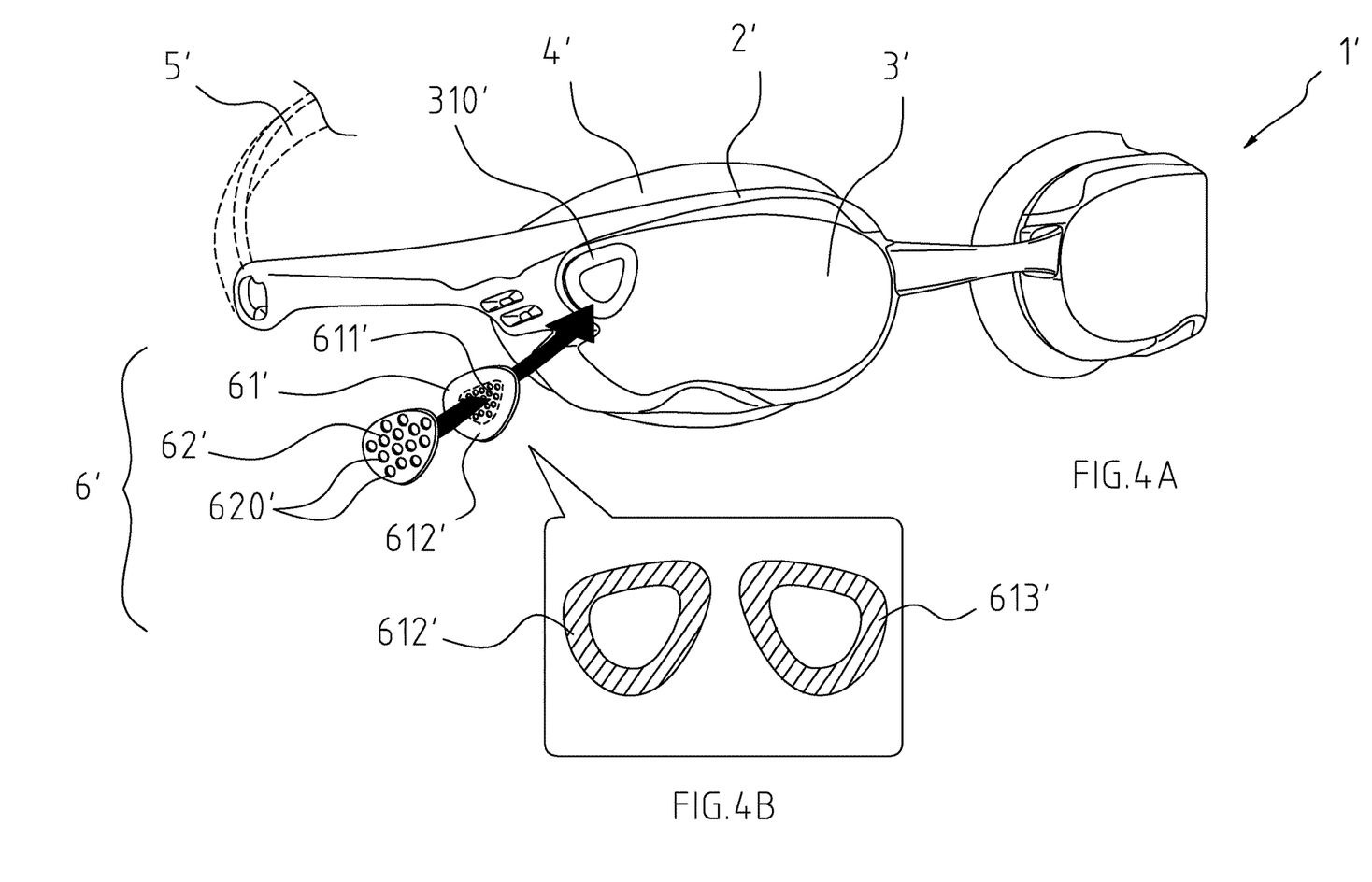
FIG. 4A to FIG. 4F are an exploded perspective view, a partially enlarged view and an assembly perspective view of swimming goggles of the second embodiment of the present invention, respectively.
Figure 4C:
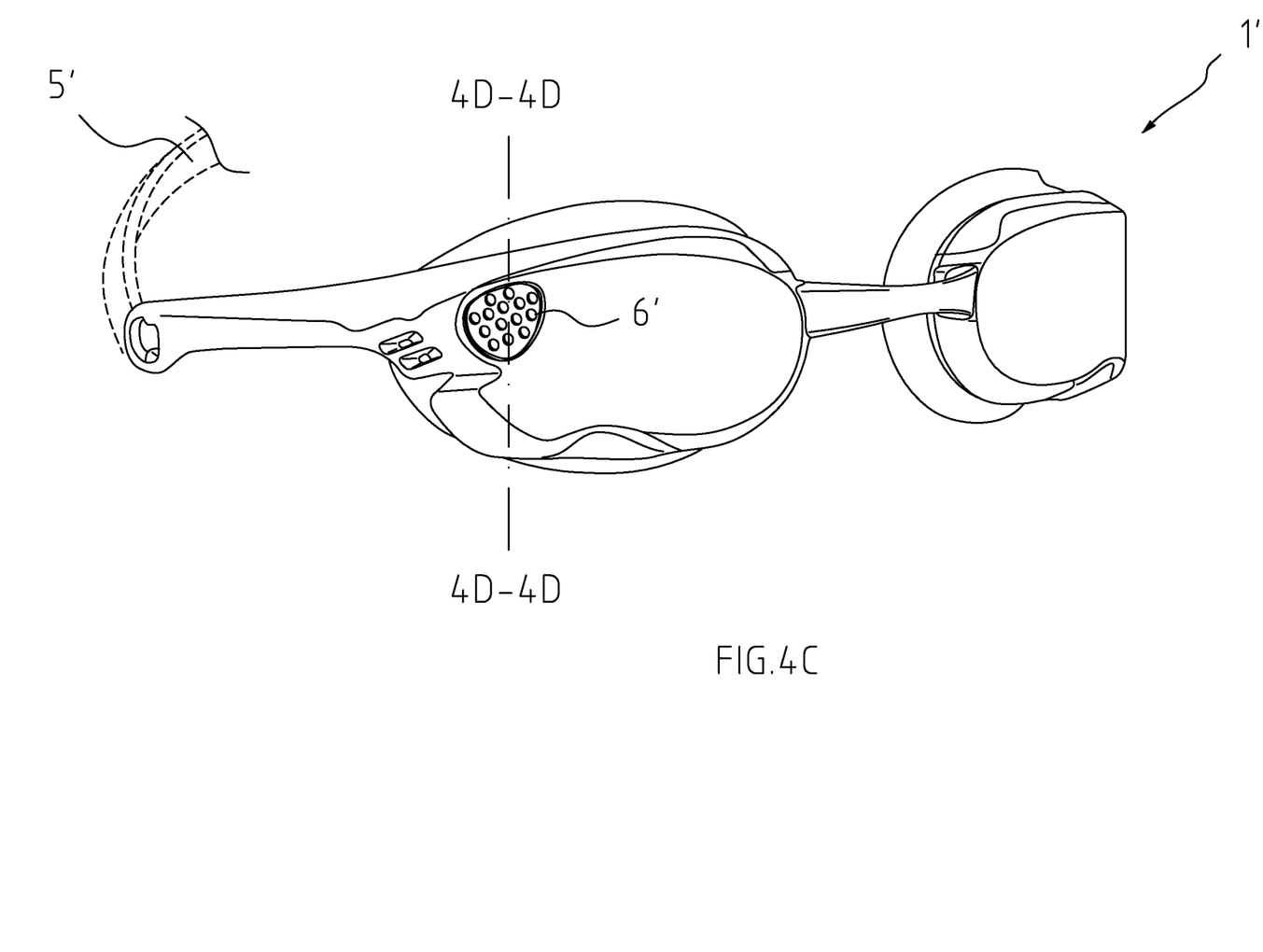

With reference to FIG. 4A to FIG. 4D as a second embodiment of the present invention, swimming goggles 1' of the present invention have a symmetrical structure including a pair of bodies 2', lenses 3' and protection pads 4', and a head strap 5'. Each lens 3' has a window 31'. The window 31' penetrates throughout the lens 3' and is located at an upper corner of a side edge of the lens 3'. The window 31' is connected with a ventilated waterproof device 6'. A periphery of the window 31' forms a depression 310'. The ventilated waterproof device 6' includes a ventilated waterproof film 61' and a protection sheet 62'. The ventilated waterproof film 61' is made of polytetrafluoroethylene and forms a plurality of micropores 611' by means of extrusion and stretch. Preferably, each of the plurality of the micropores 611' has a pore diameter of 0.1~0.5 μm. Edges of both sides of the ventilated waterproof film 61' corresponding to the depression 310' respectively have adhesive areas 612', 613' (FIG. 4B). Along with reference to FIG. 4D, the adhesive area 613' is disposed on the depression 310' of the window 31' from an outer side of the lens 3'. The protection sheet 62' forms a plurality of pinholes 620'. Each of the plurality of the pinholes 620' has a hole diameter which is greater than or equal to a pore diameter of each of the plurality of the micropores 611' of the ventilated waterproof film 61. The adhesive area 612' of the ventilated waterproof film 61' is used to fix the protection sheet 62' on the ventilated waterproof film 61'.

Figure 4D:
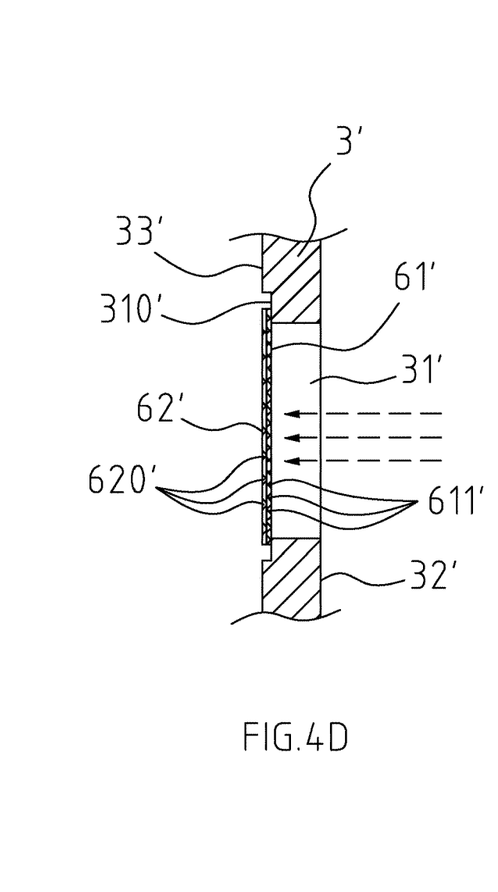

Therefore, the plurality of the micropores 611' and the 612' of the ventilated waterproof film 61' allow a heat on an inner side 32' of the lens 3' produced by human body in form of fog and water particles to permeate therethrough toward the outer side 33' of the lens 3' as a way of fog dispersion. Relatively, fog on the outer side 33' of the lens 3' is soon turned into water drops through condensation. The water drops are too large to undergo reverse permeation into the inner side 32' of the lens 3' through the plurality of the micropores 611'. Because of the effect of surface tension within the condensed water drops, water molecules pull each other as a stable state and are unable to be separated from the water drops toward the inner side 32' of the lens 3' so that the water leakage of the swimming goggles is eliminated and waterproof function thereof is thus achieved.

Figure 4E:
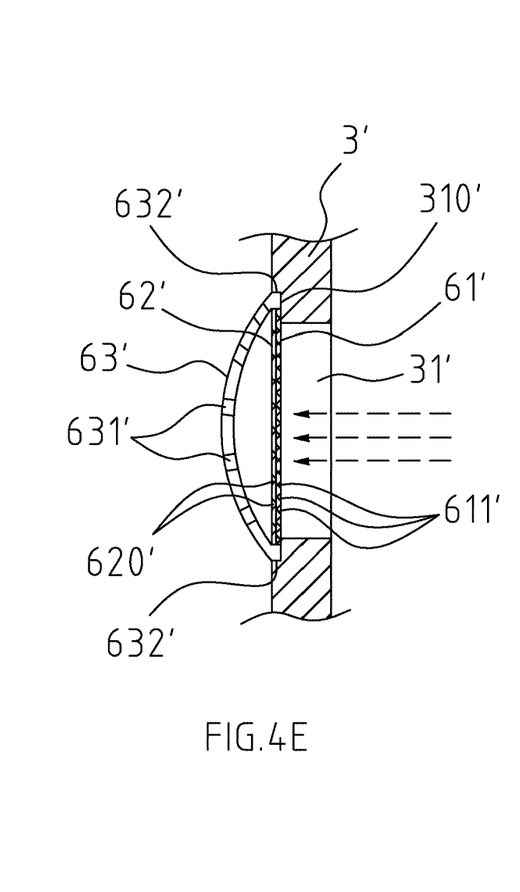
Figure 4F:
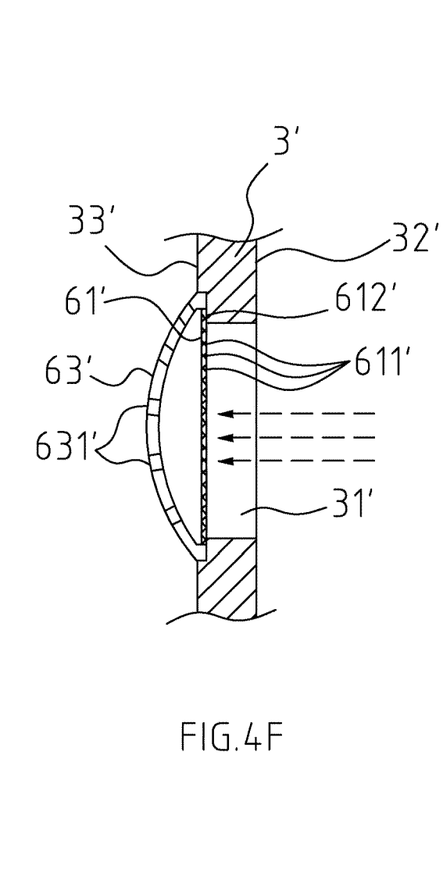

With reference to FIG. 4E, an arc shield 63' is further fixed on an outer side of the protection sheet 62' of FIG. 4D. As shown, the arc shield 63' forms a plurality of through holes 631' and a peripheral margin 632', while a hole diameter of each of the plurality of the through holes 631' is greater than a pore diameter of each of the plurality of the micropores 611' of the ventilated waterproof film 61', and the peripheral margin 632' is embedded in the depression 310', so that the arc shield 63' protects the ventilated waterproof film 61' and the protection sheet 62' from being broken caused by a direct physical impact. Similarly, with reference to FIG. 4F, swimming goggles of the present invention are shown. Compared with FIG. 4E, the swimming goggles of FIG. 4F omit the protection sheet 62'. Because of an arrangement of the arc shield 63', the protection sheet 62' can omit. The arc shield 63' protects the ventilated waterproof film 61' from being broken caused by a direct physical impact.

Figure 5:
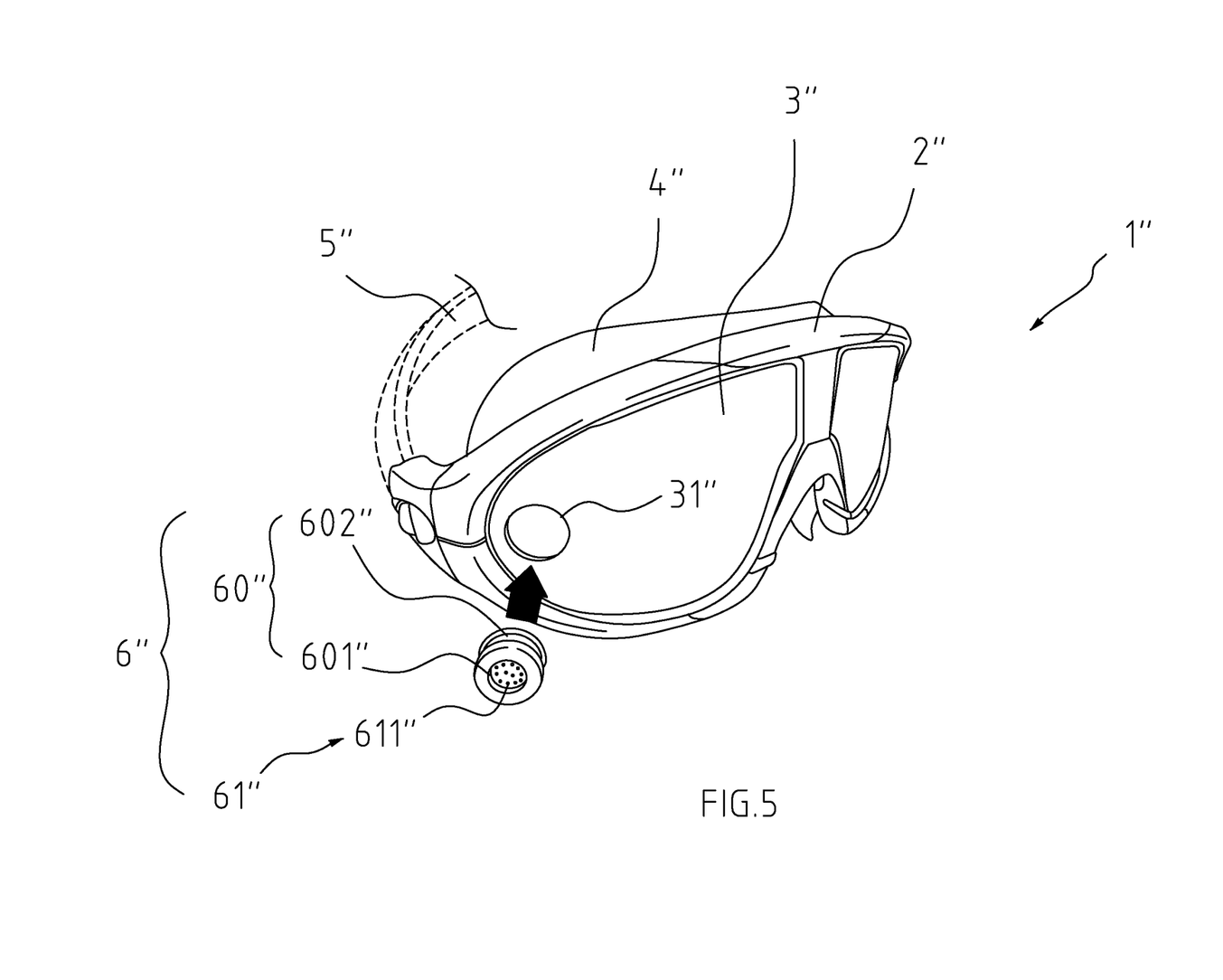
FIG. 5 to FIG. 7 are an exploded perspective view, an assembly perspective view and a cross-sectional view of swimming goggles of the third embodiment of the present invention, respectively.
Figure 6:
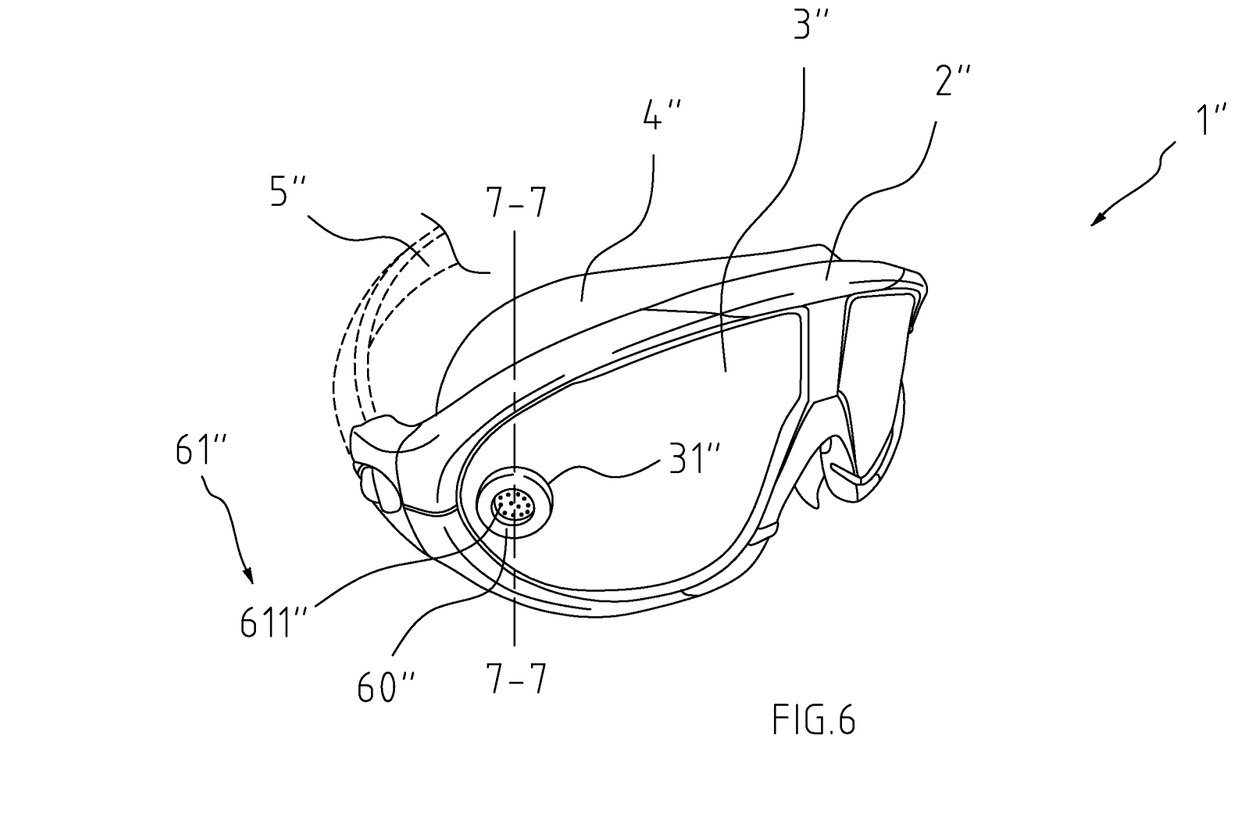
Figure 7:
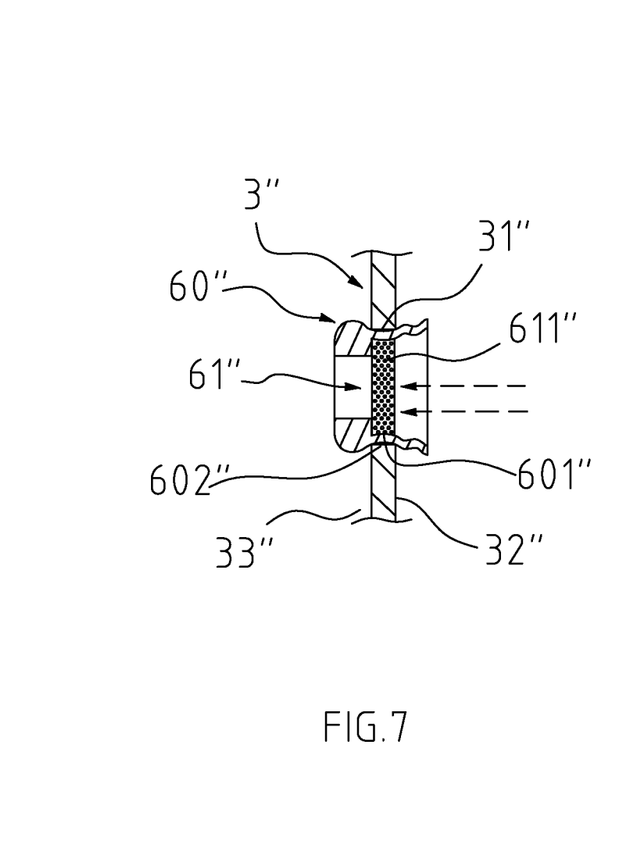

With reference to FIG. 5 to FIG. 7 as a third embodiment of the present invention, swimming goggles 1" of the present invention have a symmetrical structure including a pair of bodies 2", lenses 3" and protection pads 4", and a head strap 5". Each lens 3" has a window 31". The window 31" penetrates throughout the lens 3" and is located at a side edge of the lens 3". The window 31" is connected with a ventilated waterproof device 6". The ventilated waterproof device 6' includes a frame 60" and a ventilated waterproof film 61". The frame 60" may be a rubber sleeve including mounting holes 601" and a neck 602". An external diameter of the neck 602" is slightly greater than a diameter of the window 31" for a tight fit to the window 31" (FIG. 7). The ventilated waterproof film 61" is made of polytetrafluoroethylene and is fixed on the mounting holes 601". The ventilated waterproof film 61" forms a plurality of micropores 611" by means of extrusion and stretch. Preferably, each of the plurality of the micropores 611" has a pore diameter of 0.1~0.5 μm.

A joint between the neck 602" of the frame 60" and the window 31" is further applied with a glue (not shown). Therefore, the plurality of the micropores 611" of the ventilated waterproof film 61" allow a heat on an inner side 32" of the lens 3" produced by human body in form of fog and water particles to permeate therethrough toward the outer side 33" of the lens 3" as a way of fog dispersion. Relatively, fog on the outer side 33" of the lens 3" is soon turned into water drops through condensation. The water drops are too large to undergo reverse permeation into the inner side 32" of the lens 3" through the plurality of the micropores 611". Because of the effect of surface tension within the condensed water drops, water molecules pull each other as a stable state and are unable to be separated from the water drops toward the inner side 32" of the lens 3" so that the water leakage of the swimming goggles is eliminated and waterproof function thereof is thus achieved.

Figure 8:
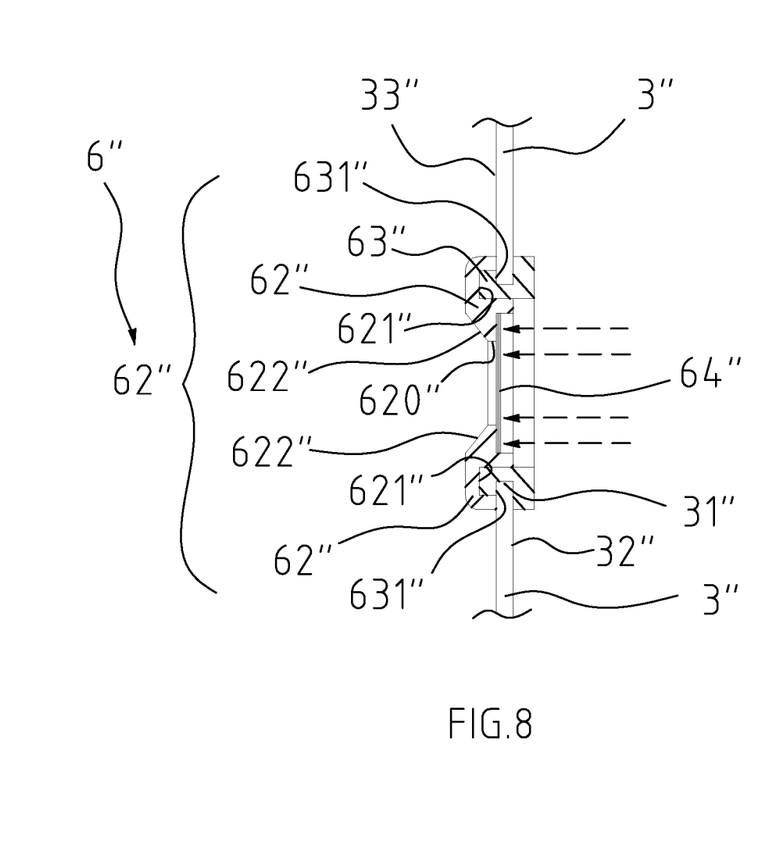
FIG. 8 is a cross-sectional view of swimming goggles of the fourth embodiment of the present invention.

With reference to FIG. 8 as a fourth embodiment of the present invention, a cross-sectional view of a ventilated waterproof device 6" is shown. The ventilated waterproof device 6" includes a frame 60" and a ventilated waterproof film 64". The frame 60" includes a base 62" and a wearing ring 63". The wearing ring 63" is made of rubber elastomer and defined with a channel 631" to fit to a periphery of the window 31". The base 62" is made of polycarbonate resin and is arranged with a clamping slot 621" which clamps the wearing ring 63" from an outer side 33" of the lens 3" to fix the wearing ring 63" onto the window 31". The base 62" is disposed with mounting holes 620" corresponding to the window 31" of the lens 3" and a slant ring surface 622" along the mounting holes 620" to avoid water accumulation. Similar with the third embodiment, the ventilated waterproof film 64" has a plurality of micropores and is fixed on a side of the mounting holes 620" from an inner side 32" of the window 31", so that the waterproof and ventilation function is also achieved.

It is understood that the invention may be embodied in other forms within the scope of the claims. Thus the present examples and embodiments are to be considered in all respects as illustrative, and not restrictive, of the invention defined by the claims.

What is claimed is:

1. Swimming goggles, comprising a pair of bodies, lenses and protection pads, and a head strap,
   wherein each lens has a window, each respective window being connected with a ventilated waterproof device that is watertight but not airtight and configured so that any fog containing water particles produced on an inner side of the lens by a wearer of the swimming goggles can permeate toward an outer side of the lens to disperse the fog;
   wherein fog that has permeated to the outer side of the lens is turned into water drops through condensation, the water drops being to large to undergo reverse permeation into the inner side of the lens.

2. The swimming goggles of claim 1, wherein each ventilated waterproof device includes a ventilated waterproof film having a plurality of micropores, each ventilated waterproof film being fixed on the respective window.

3. The swimming goggles of claim 2, wherein each of the plurality of micropores of the respective ventilated waterproof film has a pore diameter of 0.1 ~0.5 μm.

4. The swimming goggles of claim 2, wherein each window is disposed at a lower edge, an upper edge, a lower corner of a side edge, or an upper corner of the side edge of the respective lens to not obstruct a view of the wearer's eyes.

5. The swimming goggles of claim 4, wherein a periphery of each window forms a depression, at least a perimeter edge of its respective ventilated waterproof film corresponding to the depression, each depression having an adhesive area by which the ventilated waterproof film is fixed on its respective window.

6. The swimming goggles of claim 5, wherein the periphery of each window forms the respective depression, the perimeter edge of each ventilated waterproof film corresponding to the respective depression and having adhesive areas by Which each ventilated waterproof film is fixed on the respective depression, each ventilated waterproof device further including a protection sheet having a plurality of pinholes, each of the plurality of the pinholes having a hole diameter which is greater than or equal to a pore diameter of each of the plurality of micropores of the ventilated waterproof film, the adhesive areas of the ventilated waterproof film being used to fix the respective protection sheet on the ventilated waterproof film.

7. The swimming goggles of claim 6, wherein each ventilated waterproof device further comprises an arc shield having a plurality of through holes, each of the plurality of the through holes is larger than each of the plurality of the micropores of the ventilated waterproof film, the arc shield being fixed on the outer side of the lens of the respective window.

8. The swimming goggles of claim 5, wherein each ventilated waterproof device further comprises an arc shield having a plurality of through holes, each of the plurality of through holes is larger than each of the plurality of the micropores of the ventilated waterproof film, the arc shield being fixed on the outer side of the lens of the respective window.

9. The swimming goggles of claim 2, wherein the ventilated waterproof film is made of polytetrafluoroethylene, and the plurality of the micropores are formed on the ventilated waterproof film by means of extrusion and stretch.

10. The swimming goggles of claim 1, wherein each ventilated waterproof device includes a frame and a ventilated waterproof film, the frame having a tight fit to the respective window, the frame having mounting holes, the ventilated waterproof film having a plurality of the micropores, the plurality of the micropores are arranged on the respective mounting hOles.

11. The swimming goggles of claim 10, wherein each of the plurality of the micropores of the ventilated waterproof film has a pore diameter of 0.1 ~0.5 μm.

12. The swimming goggles of claim 10, wherein each frame is a rubber sleeve including said mounting holes and a neck, an external diameter of each neck being slightly greater than a diameter of the window to create the tight fit to the window.

13. The swimming goggles of claim 12, wherein a joint between the neck of each frame and its respective window being secured with a glue.

14. The swimming goggles of claim 1, wherein each ventilated waterproof device includes a frame and a ventilated waterproof film, each frame including a base and a wearing ring, each wearing ring being defined with a channel to fit to a periphery of its respective window, the base being arranged with a clamping slot which clamps the wearing ring from the outer side of the lens to fix the wearing ring onto the window, the base having mounting holes corresponding to the window of the respective lens, the ventilated waterproof film having a plurality of micropores and being fixed on the mounting holes from the inner side of the respective lens.

15. The swimming goggles of claim 14, wherein each frame is made of polycarbonate; resin, and each wearing ring is made of rubber elastomer.

16. The swimming goggles of claim 14, wherein each frame has a slant ring surface along its respective mounting holes.

17. The swimming goggles of claim 14, wherein each of the plurality of the micropores of the ventilated waterproof film has a pore diameter of 0.1 0.5 μm.

18. The swimming goggles of claim 17, wherein the ventilated waterproof film is made of polytetrafluoroethylene, and the plurality of the micropores are formed on the ventilated waterproof film by means of extrusion and stretch.

* * * * *